(12) United States Patent
Hussain et al.

(10) Patent No.: US 12,502,268 B2
(45) Date of Patent: Dec. 23, 2025

(54) DIFFRACTIVE MULTIFOCAL IMPLANTABLE LENS DEVICE

(71) Applicant: Jagrat Natavar Dave, Vadodara (IN)

(72) Inventors: Munavvar Tahir Hussain, Vadodara (IN); Sanjay Ram Swaroop Argal, Vadodara (IN)

(73) Assignee: Jagrat Natavar Dave, Vadodara (IN)

( * ) Notice: Subject to any disclaimer, the term of this patent is extended or adjusted under 35 U.S.C. 154(b) by 430 days.

(21) Appl. No.: 16/485,454

(22) PCT Filed: Oct. 11, 2017

(86) PCT No.: PCT/IB2017/056275
§ 371 (c)(1),
(2) Date: Aug. 13, 2019

(87) PCT Pub. No.: WO2018/150236
PCT Pub. Date: Aug. 23, 2018

(65) Prior Publication Data
US 2020/0038172 A1 Feb. 6, 2020

(30) Foreign Application Priority Data
Feb. 14, 2017 (IN) .............................. 201721005229

(51) Int. Cl.
*A61F 2/16* (2006.01)
*G02C 7/04* (2006.01)

(52) U.S. Cl.
CPC .......... *A61F 2/1618* (2013.01); *A61F 2/1656* (2013.01); *G02C 7/042* (2013.01); *G02C 7/044* (2013.01); *G02C 2202/20* (2013.01)

(58) Field of Classification Search
CPC ..... A61F 2/1618; A61F 2/1656; G02C 7/042; G02C 7/044; G02C 2202/20
See application file for complete search history.

(56) References Cited

U.S. PATENT DOCUMENTS

| 5,699,142 A | 12/1997 | Lee et al. |
|---|---|---|
| 2012/0140166 A1 | 6/2012 | Zhao |

(Continued)

FOREIGN PATENT DOCUMENTS

| CN | 1774216 | 5/2006 |
|---|---|---|
| CN | 101676751 | 3/2010 |

(Continued)

OTHER PUBLICATIONS

Request for Examination Dated Feb. 5, 2021 From the (ROSPATENT), Federal Government Institution of Industrial Property of the Federal Service of Intellectual Property, Patents and Trademark of the Russian Federation Re. Application No. 2019128665 and Its Translation Into English. (11 Pages).

(Continued)

*Primary Examiner* — Jerrah Edwards
*Assistant Examiner* — Aren Patel

(57) ABSTRACT

An implantable lens device has a diffractive surface defining an optical axis. The diffractive surface comprises a relief pattern extending concentrically on the surface and having a sequence of annular concentric steps characterized by alternating heights, wherein an innermost step of the relief pattern has a largest height among all other steps.

20 Claims, 7 Drawing Sheets

(56) References Cited

U.S. PATENT DOCUMENTS

| | | | | |
|---|---|---|---|---|
| 2012/0224138 | A1* | 9/2012 | Cohen | A61F 2/1618 623/6.28 |
| 2012/0283825 | A1* | 11/2012 | Houbrechts | G02B 5/1876 623/6.27 |
| 2014/0009736 | A1* | 1/2014 | Zhao | A61F 2/1654 351/159.01 |
| 2014/0135919 | A1* | 5/2014 | Gontijo | A61F 2/1618 623/6.24 |
| 2015/0359625 | A1* | 12/2015 | Argal | G02B 1/043 623/6.24 |
| 2017/0252151 | A1* | 9/2017 | Mackool | G02B 5/1895 |

FOREIGN PATENT DOCUMENTS

| | | |
|---|---|---|
| CN | 102223856 | 10/2011 |
| CN | 102395906 | 3/2012 |
| CN | 102665611 | 9/2012 |
| CN | 103955075 | 7/2014 |
| CN | 104902837 | 9/2015 |
| EP | 2377493 | 10/2011 |
| KR | 10-2017-0056675 | 6/2017 |
| RU | 2303961 | 8/2007 |
| WO | WO 2010/093975 | 8/2010 |
| WO | WO 2016/021627 | 2/2016 |
| WO | WO 2016/046439 | 3/2016 |
| WO | WO 2018/150236 | 8/2018 |

OTHER PUBLICATIONS

Ground(s) of Reason of Rejection Dated Jun. 27, 2022 From the Korean Intellectual Property Office Re. Application No. 10-2019-7026940. (7 pages).
Translation Dated Jul. 22, 2022 of Grounds of Reason of Rejection Dated Jun. 27, 2022 From the Korean Intellectual Property Office Re. Application No. 10-2019-7026940. (4 Pages).
Notification of Office Dated Mar. 11, 2022 From the State Intellectual Property Office of the People's Republic of China Re. Application No. 201780089519.3 and Its Translation Into English and Claims . . . (14 Pages).
Examination Report Dated Apr. 19, 2022 From the Istituto Nacional De La Propridad Industrial, Argentina Re. Application No. P20180102282 and its Translation into English. (6 Pages).
Notification of Office Action and Search Report Dated Mar. 29, 2021 From the State Intellectual Property Office of the People's Republic of China Re. Application No. 201780089519.3 and Its Translation of Office Action Into English. (5 Pages).
Clarifications Prior to Substantive Examination Dated Dec. 21, 2021 From the Instituto Nacional De La Propriedad Industrial Administracion Nacional De Patentes Argentina Re. Application No. 0180102282 together with an English Summary. (6 Pages).
Request for Examination Dated Oct. 22, 2021 From the (ROSPATENT), Federal Government Institution of Industrial Property of the Federal Service of Intellectual Property, Patents and Trademark of the Russian Federation Re. Application No. 2019128665 and Its Translation Into English. (9 Pages).
International Preliminary Report on Patentability Dated Jul. 19, 2019 From the International Preliminary Examining Authority Re. Application No. PCT/IB2017/056275. (16 Pages).
International Search Report and the Written Opinion Dated Feb. 6, 2018 From the International Searching Authority Re. Application No. PCT/IB2017/056275. (16 Pages).
Written Opinion Dated Feb. 1, 2019 From the International Preliminary Examining Authority Re. Application No. PCT/IB2017/056275. (7 Pages).
Final Notice of Rejection Dated Apr. 25, 2023 From the Korean Intellectual Property Office Re. Application No. 10-2019-7026940. (4 Pages).
Examination and Search Report Dated Dec. 15, 2022 From the Instituto Nacional de la Propiedad Industrial, Administracion Nacional de Patentes, Republica Argentina, INPI Argentina Re. Application No. P20180102282 and Its Translation Into English. (5 Pages).
Translation Dated May 17, 2023 of Final Notice of Rejection Dated Apr. 25, 2023 From the Korean Intellectual Property Office Re. Application No. 10-2019-7026940. (2 Pages).
Translation Dated Nov. 16, 2023 of Grounds of Reason of Rejection Dated Nov. 2, 2023 From the Korean Intellectual Property Office Re. Application No. 10-2023-7032648 (3 Pages).
Communication Pursuant to Article 94(3) EPC Dated Nov. 28, 2023 From the European Patent Office Re. Application No. 17792195.4 (4 Pages).
Grounds of Reason of Rejection Dated Nov. 2, 2023 From the Korean Intellectual Property Office Re. Application No. 10-2023-7032648 (4 Pages).

* cited by examiner

DIFFRACTIVE MULTIFOCAL IMPLANTABLE LENS DEVICE

RELATED APPLICATIONS

This application is a National Phase of PCT Patent Application No. PCT/IB2017/056275 having International filing date of Oct. 11, 2017, which claims the benefit of priority of Indian Provisional Patent Application No. 201721005229 filed on February 14, 2017. The contents of the above applications are all incorporated by reference as if fully set forth in their entirety.

FIELD AND BACKGROUND OF THE INVENTION

The present invention, in some embodiments thereof, relates to an implantable lens device and, more particularly, but not exclusively, to a multifocal implantable lens device. Some embodiments of the present invention relate to a method of fabrication the multifocal implantable lens device, and some embodiments of the present invention relate to a method of using the multifocal implantable lens device.

The quality of vision depends on many factors including the size and shape of the eye, and the transparency of the cornea and lens. When age or disease causes the lens to become less transparent, vision deteriorates because of the diminished light which can be transmitted to the retina. This deficiency in the lens of the eye is medically known as a cataract. An accepted treatment for this condition is surgical removal of the lens and replacement of the lens function by an intraocular lens (IOL).

Over the years, numerous types of IOLs have been developed for correcting vision deficiencies. Generally, such lenses operate accordion to one two basic optical principles: refraction and diffraction. A typical IOL is manufactured from polymethyl methacrylate, has a diameter of about 5-7 mm, and is supported in the eye by the spring force of flexible loops called haptics. Other materials are also used, and there are a variety of lens style and haptic designs.

Multifocal lens has more than one point of focus. A bifocal, which is a type of multifocal, has two points of focus, one at distance and the other at near. In multifocal IOL the aim is to increase the range of distinct vision and hence to reduce the dependence on additional spectacle corrections. Rigid lenses that have two or more optical powers are used to divide the incident light between axially separated images. Overall image quality is affected by the number of lens powers, and the image quality of the focused component itself.

One type of multifocal IOL is diffractive multifocal IOL. A pair of diffraction orders is used to provide two lens powers simultaneously by using rigid implant. One power is used for distance vision and the other power is used for near vision. In both cases defocused light is also incident on the retina, but the human visual system is tolerant of contrast-related image variations and this does not appear to be a problem for most patients. The diffractive design utilizes the full aperture and is tolerant of pupil size variations and modest decentration.

Generally, a diffractive lens consists of any number of annular lens zones of equal area. Between adjacent zones optical steps are provided with associated path length differences which usually are absolutely smaller than a design wavelength. The area or size of the zones determines the separation between the diffractive powers of the lens; this separation increases with decreasing zone area. The optical path difference determines the relative peak intensities of the various diffractive powers. For example, when the optical path difference equals half the wavelength there are two principal diffractive powers, the zeroth and the first order diffractive power. For absolute path differences which are smaller than half the wavelength, the zeroth order power is dominant, while for optical path differences which are of order of one wavelength the first diffractive order power is dominant.

U.S. Pat. No. 8,636,796 discloses an intraocular lens with two kinoform diffraction profiles that form two distinct focal points on its optical axis. The two diffraction profiles superposed each other, such that a relief pattern including large sawteeth alternating with small sawteeth, wherein the innermost sawtooth is one of the small sawteeth and the next-to-innermost sawtooth is one of the larger sawteeth and has the largest height.

U.S. Pat. No. 5,089,023 discloses an intraocular optical implant which includes a refractive/diffractive lens having an anterior surface and a posterior surface and a generally anterior-posterior optical axis. At least one of the anterior and posterior surfaces of the lens has a diffractive lens profile covering about half the effective lens area of the lens.

U.S. Pat. No. 5,699,142 discloses a diffractive multifocal ophthalmic lens having an apodization zone that gradually shifts the energy balance from the near focus to the distance focus over a substantial portion of the lens so that the outer region of the lens directs all of its energy to the distance focus.

U.S. Pat. No. 6,536,899 disclose a multifocal lens including a plurality of annular zones. Each annular zone is divided into two annular sub-zones such that the refractive powers within the sub-zones exhibit at least two diffractive powers and at least one of the diffractive powers substantially coincides with the average refractive power of each annular zone.

Additional background art includes U.S. Pat. Nos. 4,881,805, 5,344,47, 7,377,641, 4,162,122, 4,210391, 4,338,005. 4,340,283, 4,995,714, 4,995,715, 4,881,804, 4,881,805, 5,017,000, 5,054.905, 5,056,908, 5,120,120, 5,121,979, 5,121,980, 5,144,483, 5,117,306, 5,076,684, 5,116,111, 5,129,718, 4,637,697, 4,641,934 and 4,655,565, and European Patent No. 1194797B1,

SUMMARY OF THE INVENTION

According to an aspect of some embodiments of the present invention there is provided an implantable lens device, having a diffractive surface defining an optical axis. The diffractive surface comprises a relief pattern extending concentrically on the surface and having a sequence of annular concentric steps characterized by alternating heights, wherein an innermost step of the relief pattern has a largest height among all other steps.

According to an aspect of some embodiments of the present invention there is provided a method of manufacturing an implantable lens device. The method comprises forming on a surface of an optical material a relief pattern extending concentrically on the surface and having a sequence of annular concentric steps characterized by alternating heights, wherein an innermost step of the relief pattern has a largest height among all other steps.

According to an aspect of some embodiments of the present invention there is provided a method of treating vision of a subject. The method comprises implanting the lens device in an eye of the subject.

According to some embodiments of the invention the sequence of annular concentric steps is characterized by varying primary widths, such that at least two steps do not have the same primary width. Optionally and preferably no two steps have the same primary width.

According to some embodiments of the invention the sequence of annular concentric steps is characterized by varying secondary widths, such that at least two steps do not have the same secondary width. Optionally and preferably no two steps have the same secondary width.

According to some embodiments of the invention the sequence of annular concentric steps is characterized by varying slopes, such that at least two steps do not have the same slope. Optionally and preferably no two steps have the same slope.

According to some embodiments of the invention the relief pattern corresponds to a combination of a first periodic diffraction profile selected to enable formation of a first set of diffraction foci on the optical axis and a second periodic diffraction profile to enable formation of a second set of diffraction foci on the optical axis, wherein each diffraction profile has multiple periods, and wherein the innermost step corresponds to a sum of innermost periods of the two diffraction profiles.

According to some embodiments of the invention at least one of the diffraction profiles is apodized with decreasing amplitudes as a function of a radial coordinate characterizing the diffraction profile.

According to some embodiments of the invention the first set of foci is nearer to the diffractive surface than the second set of foci, and wherein a characteristic slope of each period of the first diffraction profile is less than a characteristic slope of a corresponding period of the second diffraction profile.

According to some embodiments of the invention the sequence of annular concentric steps comprises an odd-numbered sub-sequence of annular concentric steps providing a first set of foci, and an even-numbered sub-sequence of annular concentric steps providing a second set of foci, the first set of foci being nearer to the diffractive surface than the second set of foci, and wherein a diffractive optical power describing each focal point of the second set is at least 51 percents of a diffractive optical power describing any focal point of the first set.

According to some embodiments of the invention at least one of the odd-numbered sub-sequence of annular concentric steps and the even-numbered sub-sequence of annular concentric steps, is characterized by a decreasing step-height as a function of the radial coordinate.

According to some embodiments of the invention a characteristic slope of each odd-numbered step in the odd-numbered sub-sequence is less than characteristic slope of an even-numbered step immediately following the odd-numbered step.

According to some embodiments of the invention a ratio between a diffractive optical power describing a focal point of the farther set of foci and a diffractive optical power describing a corresponding focal point of the nearer set foci is generally constant throughout the sets of foci.

According to some embodiments of the invention a diffractive optical power describing each focal point of the nearer set of foci is at least +1.5 diopters. According to some embodiments of the invention a diffractive optical power describing each focal point of the nearer set of foci is at most +5 diopters.

According to some embodiments of the invention a diffractive optical power describing each focal point of the farther set of foci is at least +0.77 diopters. According to some embodiments of the invention a diffractive optical power describing each focal point of the farther set of foci is at most +3.0 diopters.

According to some embodiments of the invention, for at least one set of the two sets of foci, diffractive optical powers describing any pair of adjacent foci of the set are at least one percent from each other.

According to some embodiments of the invention the surface has a curvature selected to form on the optical axis a refractive focal point which is farther than any diffractive focus formed by the diffraction profiles.

According to some embodiments of the invention the curvature and steps are selected such that when a light beam passes through the surface and through a pupil aperture of about 3 mm, the percentage of light intensity which is focused onto the refractive focal point is from about 42% to about 58%. According to some embodiments of the invention the curvature and steps are selected such that when a light beam passes through the surface and through a pupil aperture of about 3 mm, the percentage of light intensity which is focused onto the a farther set of the two sets of foci is from about 14% to about 26%. According to some embodiments of the invention the curvature and steps are selected such that when a light beam passes through the surface and through a pupil aperture of about 3 mm, the percentage of light intensity which focused onto the a nearer set of the two sets of foci is from about 24% to about 36%.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
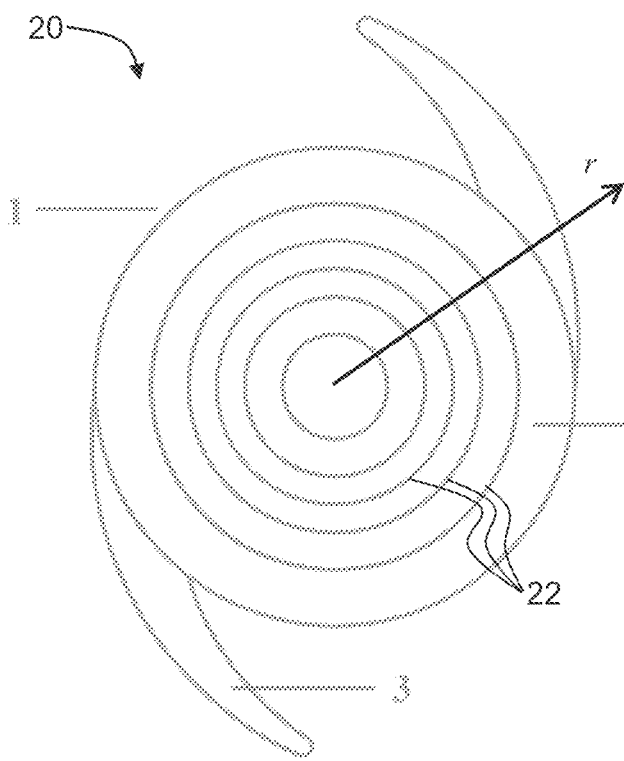
FIGS. 1A-F are schematic illustrations of top views (FIGS. 1A-E) and a side view (FIG. 1F) of a multifocal lens device, according to various exemplary embodiments of the present invention.

The present invention, in some embodiments thereof, relates to an implantable lens device and, more particularly, but not exclusively, to a multifocal implantable lens device. Some embodiments of the present invention relate to a method of fabrication the multifocal implantable lens device, and some embodiments of the present invention relate to a method of using the multifocal implantable lens device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

When a ray of light moving in air and striking a surface of a light-transmissive substance at an angle $\alpha_1$ as measured from a normal to the surface, it is refracted into the substance at an angle which is determined by Snell's law, which is mathematically realized through the following equation:

$$n_A \sin \alpha_1 = n_S \sin \alpha_2$$

where $n_S$ is the index of refraction of the substance, $n_A$ is the index of refraction of the air, and $\alpha_2$ is the angle in which the ray is refracted into the substance. Similarly to $\alpha_1$, $\alpha_2$ is measured from a normal to the surface. A typical value of $n_A$ is about 1.

Another optical phenomenon is diffraction which is the slight bending of light as it passes around the edge of an object, or at an opening thereof. The amount of bending depends on the size of the wavelength of light compared to the size of the opening or edge. If the opening is much larger than the light's wavelength, the bending will be almost unnoticeable. However, if the two are closer in size or equal, the amount of bending is considerable, and easily seen with the naked eye.

Optical effects resulting from diffraction are produced through the interaction of light waves originating from different regions of the opening causing the diffraction. Illustratively, one can view this interaction as one of two types of interferences: (i) a constructive interference when the crests of two waves combine to produce an amplified wave; and (ii) a destructive interference when a crest of one wave and a trough of another wave combine, thus canceling each other.

Referring now to the drawings, FIGS. 1A-F illustrate top views (FIGS. 1A-E) and a side view (FIG. 1F) of a multifocal lens device 20, according to various exemplary embodiments of the present invention. Device 20 comprises a diffractive surface 1 defining an optical axis 26 and having a relief pattern 2 which extend concentrically on surface 1. The relief pattern 2 is optionally and preferably in the form of a sequence of annular concentric steps 22. The number of steps is preferably, but not necessarily, from about 3 to about 40.

As used herein, the term "about" refers to ±10%.

Device 10 can be used in more than one application. In some embodiments the device is implemented as intraocular lens device, in which case the lens body is constituted as an ophthalmic intraocular lens, and in some embodiments the device is implemented as a contact lens, in which case the lens body is constituted as a contact lens.

In any of the above embodiments, the surface 1 preferably has an aspherical base profile such that lens 20 exhibits a negative spherical aberration in a range of from about −0.05 microns to about −0.15 microns across the entire optical power of lens 20. Such asphericity provides a balance between the sensitivity to the contrast and the field depth by inducing a moderate positive spherical aberration in the eye hosting lens device 20.

Figure 1B:
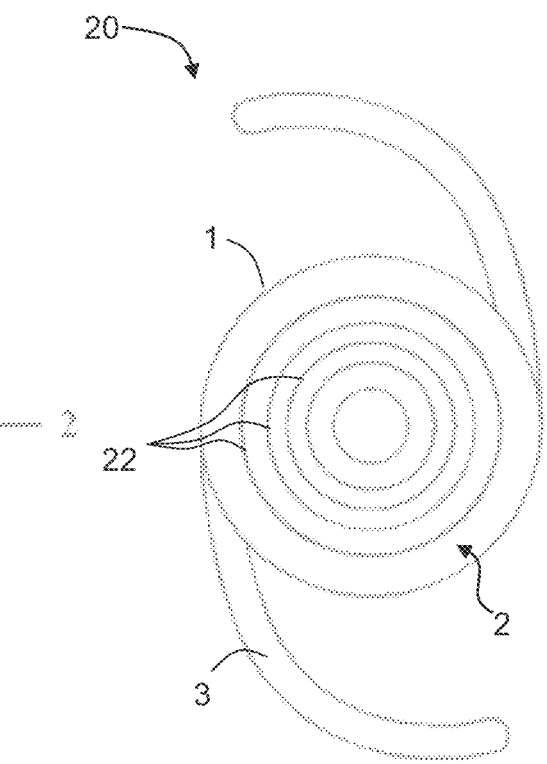
Figure 1C:
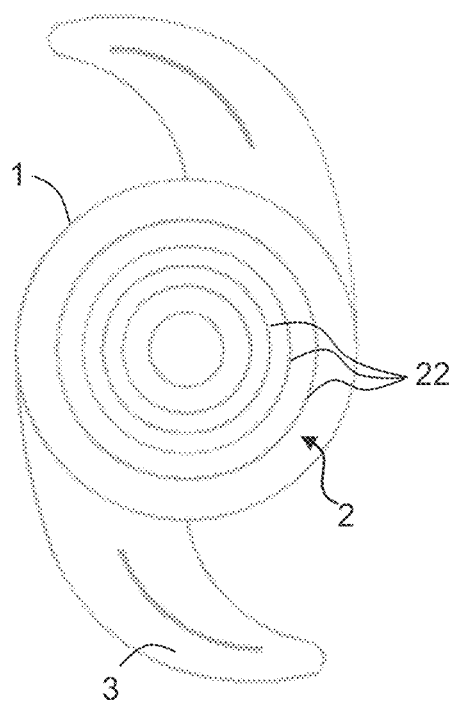
Figure 1D:
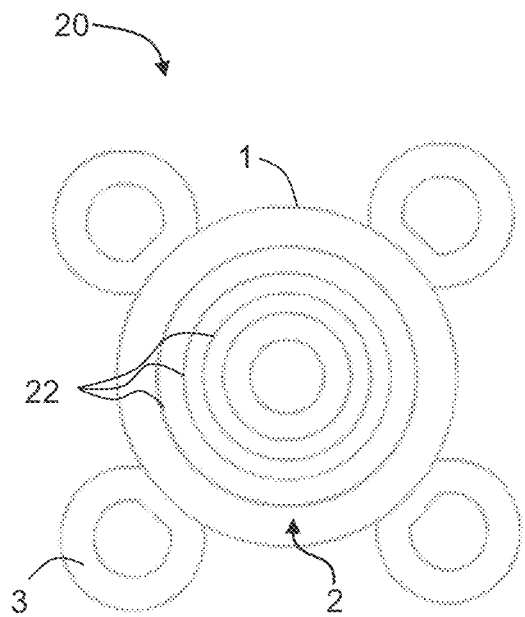
Figure 1E:
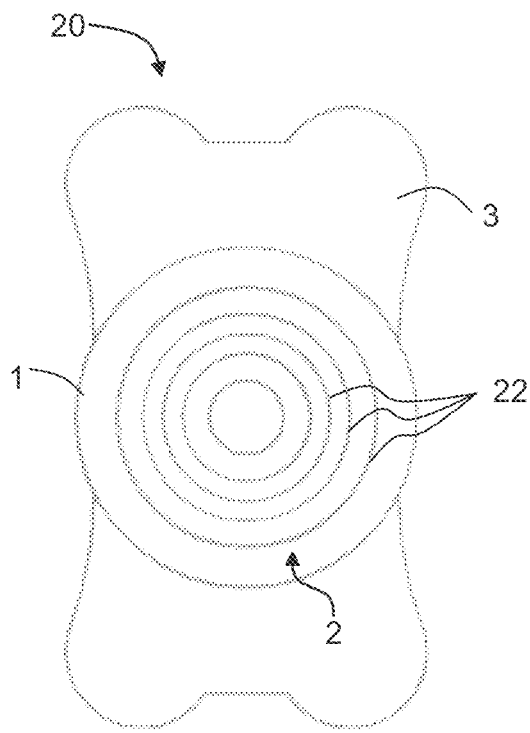
Figure 1F:
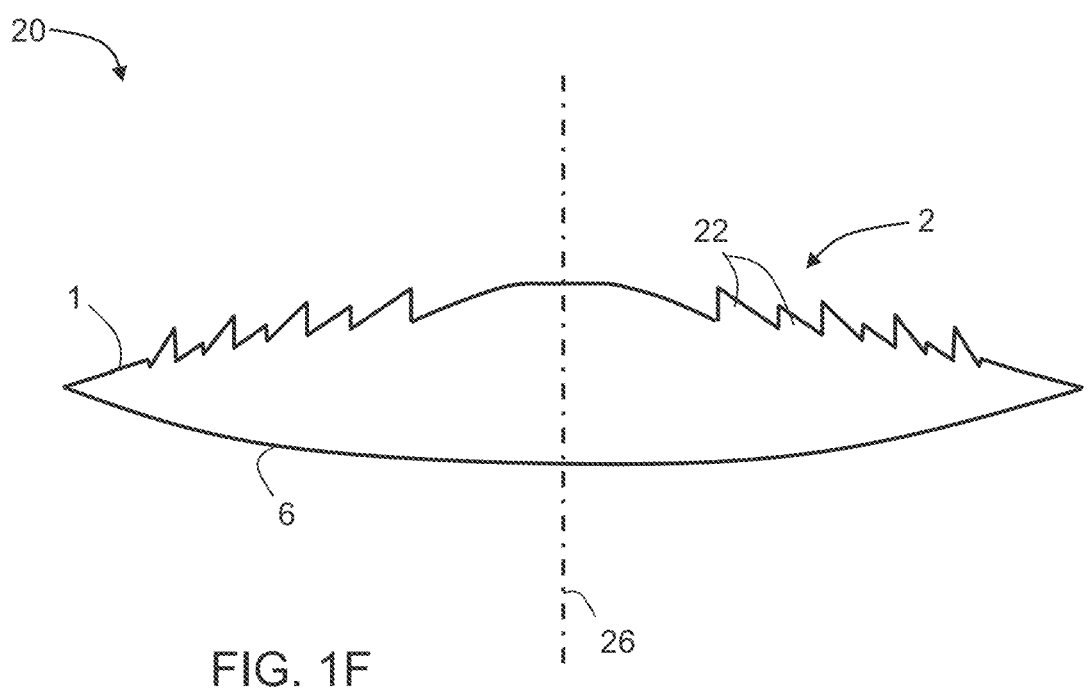

Typically, lens 20 includes an anterior surface and a posterior surface, wherein one of these surfaces is the diffractive surface 1, and the surface opposite to the diffractive surface 1 is referred to as surface 6 (see FIG. 1F). In the representative example illustrated in FIG. 1F, diffractive surface 1 is the anterior surface. One of ordinary skilled in the art, would know how to adjust FIG. 1F for the case of a diffractive surface on the posterior surface of device 20.

In some embodiments of the invention, one of the surfaces of device 20 has a toric profile. Typically, but not necessarily, the surface opposite to the diffractive surface 1 can have a toric profile. For example, diffractive surface 1 can have an aspheric profile, and the opposite surface 6 has a toric profile.

The term "aspheric profile" is well known to those skilled in the art. To the extent that any further explanation may be required, this term is employed herein to refer to a radial profile of a surface that exhibits deviations from a spherical surface. Such deviations can be characterized, for example, as smoothly varying differences between the aspherical profile and a putative spherical profile that substantially coincides with the aspherical profile at the small radial distances from the apex of the profile.

From a mathematical standpoint, an aspheric profile is a type of a conic section. A conic section can be characterized by a parameter known as a conic constant k, wherein k>−1 corresponds to an ellipse (k>−1, k≠0) or a circle (k≠0), k=−1 corresponds to a parabola, and a k<−1 corresponds to a hyperbola.

For a given conic section k, the sag Z(s) of the aspheric surface at any point s, s being the radial distance from the optical axis of lens device 20, can be written as:

$$Z(s) = \frac{Cs^2}{1 + \sqrt{1 - (1+k)C^2 s^2}} + A_4 s^4 + A_6 s^6 + \ldots$$

where C is the curvature (inverse of radius) of the base sphere at the optical axis, and $A_4$, $A_6$, ... are 4th, 6th, etc order aspheric terms. The first term in the above equation describes the first order deviation of the aspheric surface from a sphere, while the other terms represent higher order corrections.

In various exemplary embodiments of the invention the aspheric profile is characterized by a conic constant which is less than −1, and preferably not less than −100, more preferably in a range of from about −1.1 to about −3, more preferably from about −1.1 to about −1.37, inclusive. The conic constant can be selected based on the desired curvature radius of the surface and the desired asphericity. Typical values for C are, without limitation, from about 0.006 mm$^{-1}$ to about 0.1 mm$^{-1}$ or from about 0.002 mm$^{-1}$ to about 0.2 mm$^{-1}$ (in absolute value). The values for the higher order aspheric terms can be selected such that the contribution of higher order term is less than 10% from the value of Z(s).

The term "toric profile" is also well known to those skilled in the art. To the extent that any further explanation may be required, this term is employed herein to refer to a radial profile of a surface having a first refracting power along a first meridian and a second refracting power along a second meridian, wherein the first and second meridians are perpendicular to each other and wherein the first and second refracting power differ from each other. Typically, the shape of the tori surface is approximately that of a lateral section of a torus.

From a mathematical standpoint, a toric profile can be characterized by two conic constants $k_1$ and $k_2$, each corresponding to one of the two meridians.

For given conic sections $k_1$ and $k_2$, the sag toric(r, θ) of a toric surface at any point (r, θ), r being the radial distance from the optical axis of lens device 20 and θ being the angle measured from the main meridian, can be written as:

$$\text{toric}(r, \theta) = \frac{(c_1 \cos^2\theta + c_2 \sin^2\theta) r^2}{1 + \sqrt{1 - (1+k_1)c_1^2 r^2 \cos^2\theta - (1+k_2)c_2^2 r^2 \sin^2\theta}}$$

where $c_1$ and $c_2$ are the curvatures along the respective meridians.

Typical values for $c_1$ and $c_2$ are, without limitation, from about 0.006 mm$^{-1}$ to about 0.1 mm$^{-1}$ or from about 0.002 mm$^{-1}$ to about 0.2 mm$^{-1}$. Typical values for $k_1$ and $k_2$ are, without limitation, is less than −1, more preferably from about −1.1 to about −3, or from about −1.1 to about −1.37, inclusive.

In some embodiments of the present invention the toric profile is devoid of spherical aberration, wherein a cylinder value characterizing lens body 10 can has any value, preferably at least 1 diopter or at least 2 diopters or at least 2.5 diopters or at least 3 diopters or at least 3.5 diopters or at least 4 diopters or at least 4.5 diopters or at least 5 diopters or at least 5.5 diopters or at least 6 diopters. In some embodiments of the present invention the cylinder has a value which is in the range of 1-20 diopters, inclusive, more preferably an integer value or half-integer value in the range of 1-20 diopters, inclusive. A cylinder value of a lens measures the deviation from sphericity of a particular part of the lens's surface. The term "cylinder" is originated from cylindrical lenses which inherently have different foci lengths in different direction. The optical effect caused by a lens having a non-zero cylinder value is known as surface astigmatism. In optometry nomenclature, the term "astigmatism" is also used to describe a physiological defect, for example, when the cornea has an irregular curvature. For subjects with astigmatism, a certain cylinder value in the lens is desired since it corrects the eye's astigmatism.

A toric surface which is devoid of spherical aberration is also known in the literature as an "aberration neutral" surface. Use of aberration neutral surface is unlike conventional lens devices which employ negative asphericity so as to compensate for the shape of the cornea. The present Inventors discovered that a judicious selection of the conical constants $k_1$ and $k_2$ allows the use of aberration neutral surface at the toric side, while maintaining adequate cylinder value.

In various exemplary embodiments of the invention lens device 20 comprises two or more haptic structures 3. Haptic structures 3 can have any shape suitable for fixating device 20 in the eye of a subject. FIGS. 1A-B illustrate embodiments in which device 20 includes two haptic structures 3, each shaped as a linear arc, FIG. 1C illustrates an embodiments in which device 20 includes two generally planar haptic structures 3, each shaped as an arc, FIG. 1C illustrates an embodiments in which device 20 includes two generally planar haptic structures 3, each shaped as a closed ring, and FIG. 1C illustrates an embodiments in which device 20 includes two generally planar haptic structures 3, each shaped as a plate having two or more outwardly protruding pads.

Figure 2:
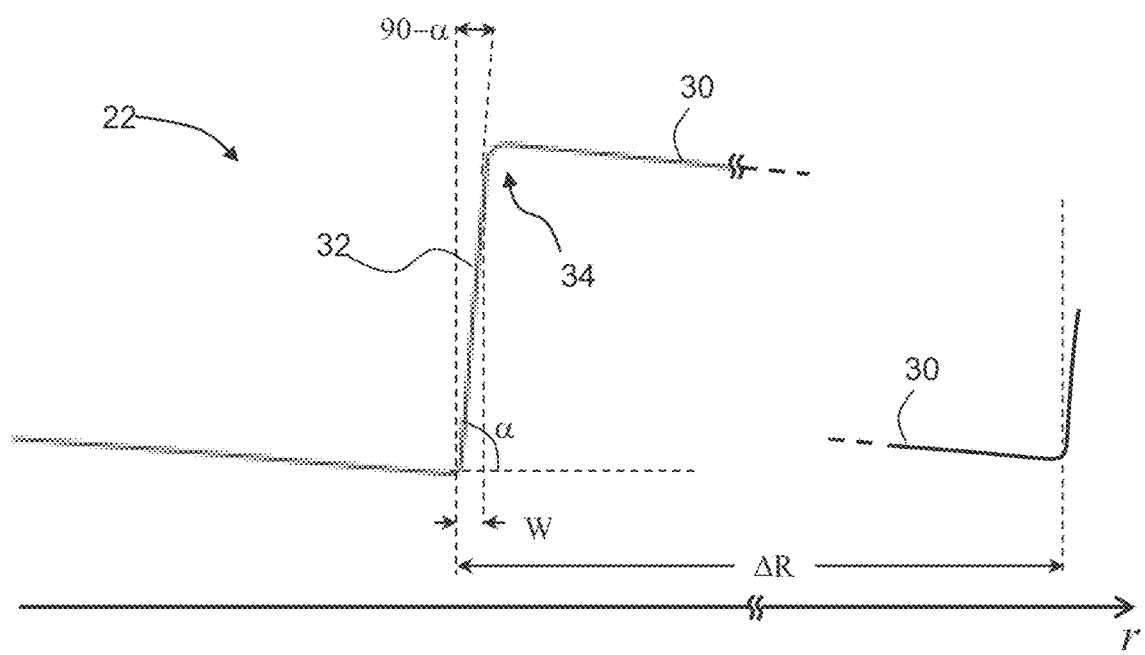
FIG. 2 is a schematic illustration of a magnified view of a preferred shape of a single step of a relief pattern, according to some embodiments of the present invention.

A magnified view of a preferred shape of a single step 22 of pattern 2 is illustrated in FIG. 2. As shown, the step has a primary surface 30, a secondary surface 32 and a rounded apex 34 between the first 30 and second 32 surfaces. The advantage of apex 34 is that it reduces diffused light and improves vision quality. The curvature of rounded apex 34 is characterized by a radius that is preferably in the submicron range, The primary surfaces 30 typically provide a zero-order refractive power for far-vision. Secondary surface 32 is substantially steeper than primary surface 30, and typically provide diffraction power for near-vision and intermediate vision. Each step constitutes the optical zones of the lens device 20, and is therefore interchangeably referred to herein as a zone of lens device 20.

The secondary width W of the step is defined as the projection of the secondary surface 32 onto the radial direction r, the slope α of the step is defined as the angle of inclination between the line forming secondary surface 32 and the radial direction r, and the full width ΔR of the step is defined as the aggregate projections of both the primary 30 and the secondary 32 surfaces onto the radial direction r. For any of the steps in pattern 2, a typical width is, without limitation from about 20 nanometer to about 200 nanometer, and a typical slope is, without limitation from about 65° to about 89°.

In some embodiments of the present invention the sequence of annular concentric steps is characterized by varying secondary widths, such that no two steps have the same secondary width W, as defined above with reference to FIG. 2, some embodiments of the present invention the sequence of annular concentric steps is characterized by varying primary widths, such that no two steps have the same primary width R, as defined above with reference to FIG. 2, and in some embodiments of the present invention the sequence of annular concentric steps is characterized by varying slopes, such that no two steps have the same slope α as defined above with reference to FIG. 2. The present inventors found that varying primary widths, secondary widths and/or varying slopes provide the eye hosting the lens device with a near vision and/or intermediate vision with a varying diffractive optical power. This is unlike conventional lenses which provide one a single-valued diffractive optical power for the near vision and another diffractive optical power for the intermediate vision.

Each component of lens device 20, including, without limitation, surface 1 and haptic structures 3, can be made of any optical material which is sufficiently transparent to visible light and which is suitable for optics. In various exemplary embodiments of the invention at least one component of the lens device is made of biocompatible material, which can be either hydrophilic or hydrophobic. The material can be or comprise at least one substance selected from the group consisting of PMMA, HEMA, collagen and acrylic material. Also contemplated are materials disclosed, for example, in U.S. Published Application No. 20160058552, the contents of which are hereby incorporated by reference.

It is expected that during the life of a patent maturing from this application many relevant materials for implantable lenses will be developed and the scope of the term optical material is intended to include all such new technologies a priori.

Figure 3:
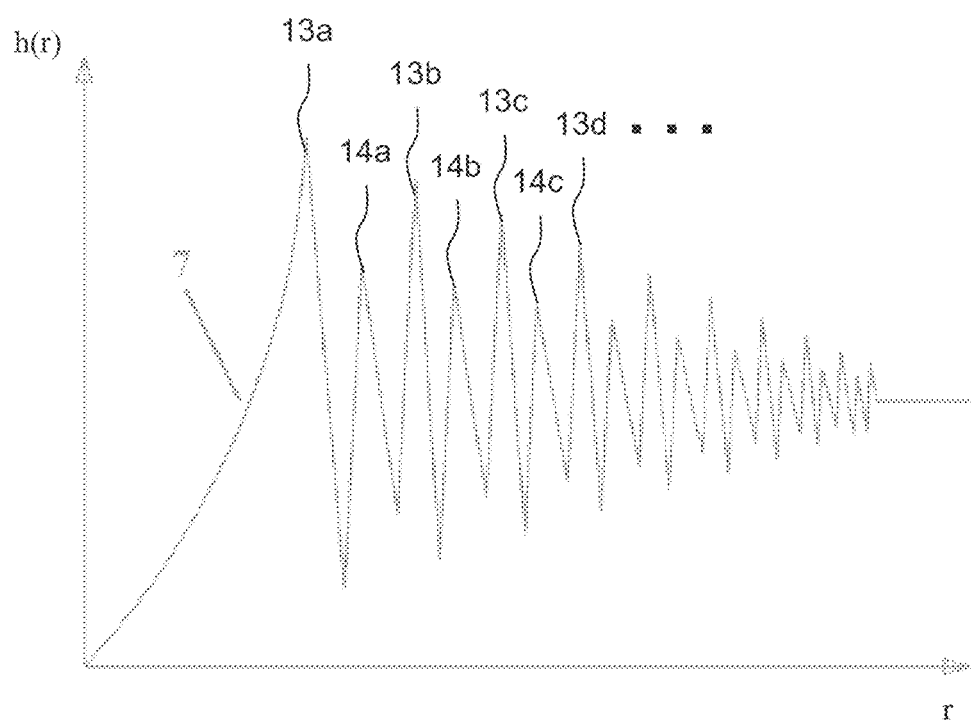
FIG. 3 is a graph showing a diffraction profile, according to some embodiments of the present invention.

The sequence of annular concentric steps 22 is optionally and preferably characterized by alternating heights. FIG. 3 is a graph showing a diffraction profile 7 that is effected by steps 22, in the form of a height function h(r), where r is a radial coordinate r measured outwardly from the center of surface 1 (see FIG. 1A). The height function h(r) is generally periodic, wherein each period corresponds to one step of relief pattern 2, such that the amplitude of the h(r) for a particular period is the height of the corresponding step. In FIG. 3, the odd-numbered periods are designated 13a, 13b, and so on, and the even-numbered periods are designated 14a, 14b, and so on. Thus, the first period, which corresponds to the innermost step, is designated 13a, and the second period, which corresponds to the next-to-innermost step, is designated 14a, and so on. As shown, the innermost step of the relief pattern has a largest height among all other steps. It was found by the present inventors that such configuration allows the innermost step to provide, in part, a near vision. This is unlike conventional lenses in which the innermost step of the relief pattern is not of the largest height, and therefore can only provide an intermediate vision.

The heights of the steps are alternating in the sense that for any pair of adjacent steps of the relief pattern, one step of the pair has a height which is larger than the height of another step of the pair. Thus, for example, the height of the next-to-innermost step (corresponding to period 14a in FIG. 3) is between two odd-numbered steps (corresponding to periods 14a and 14b in FIG. 3) that are higher than this next-to-innermost step.

Figure 4A:
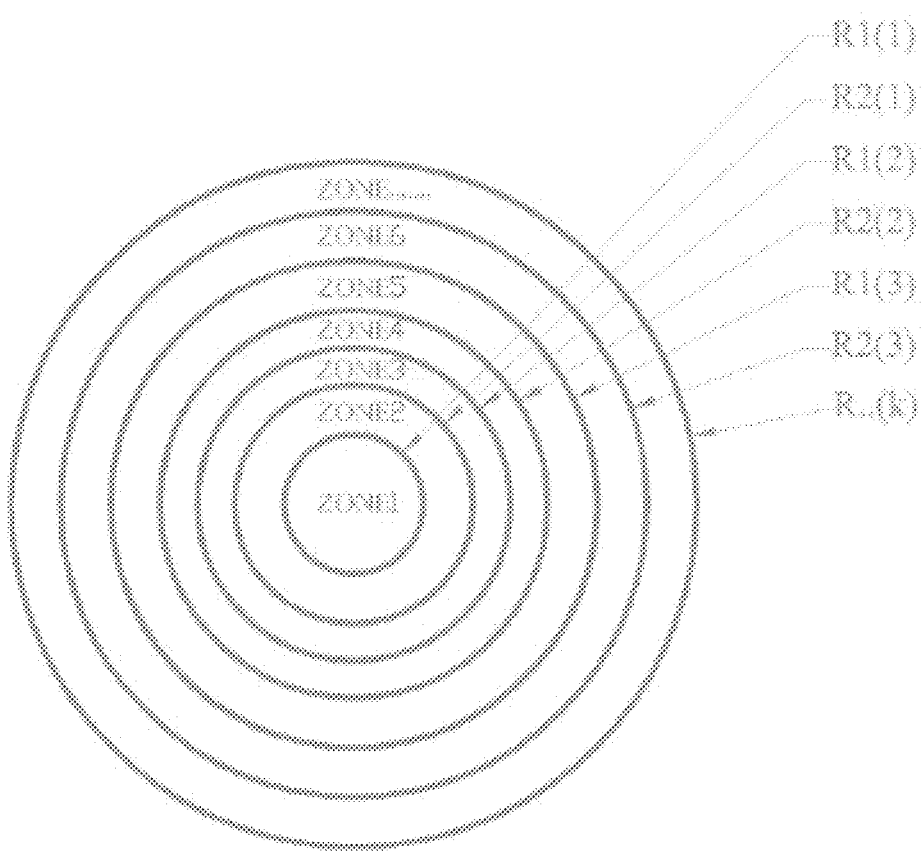
FIGS. 4A and 4B are schematic illustrations of a top view (FIG. 4A) and side view (FIG. 4B) of odd and even zones of a lens device, according to some embodiments of the present invention.

FIG. 4A is a schematic illustration of a top view of relief pattern 2. Shown is a plurality of optical zones and the corresponding primary widths. The innermost zone is denoted ZONE1, the next-to-inner zone is denoted ZONE2, and so on. The odd-numbered zones (ZONE1, ZONE3, etc) optionally and preferably provide the eye hosting the lens device with a near vision, and the even-numbered zones (ZONE2, ZONE4, etc) optionally and preferably provide the eye hosting the lens device with an intermediate vision. The radii of the planar region (perpendicularly to the optical axis) enclosed by the odd-numbered zones are designated R1(1), R1(2), etc, and the radii of the planar regions enclosed by the even-numbered zones are designated R2(1), R2(2), etc. In various exemplary embodiments of the invention, at least two of the zones have different planar areas. Preferably, no two zones have the same planar area. The planar area of a zone is the area of the planar annulus that is formed by projecting the respective zone on a plane that is perpendicular to the optical axis.

A representative example of a mathematical function that describes the radii of the odd-number zones is $$R1(k) = \sqrt{2kf_1\lambda}$$

where k is an odd integer (k=1, 3, 5, . . . ), $f_1$ is the near-vision focal length of the first-order diffraction effect by the respective odd-number zone, and $\lambda$ is the wavelength at which the eye has greatest sensitivity (typically 550 nm). Typically the value of $f_1$ in millimeters relates to the respective near-vision diffractive addition power $d_1$ in units of diopters via $f_1 = 1000/d_1$.

A representative example of a mathematical function that describes the radii of the even-number zones is $$R2(k) = \sqrt{mf_2\lambda}$$

where m is an odd integer (m=2, 4, 6, . . . ), $f_2$ is the intermediate-vision focal length of the second-order diffraction effect by the respective even-number zone, and $\lambda$ is as defined above. Typically the value of $f_2$ in millimeters relates to the intermediate-vision diffractive addition power $d_2$ in units of diopters via $f_1 = 1000/d_2$.

Figure 5A:
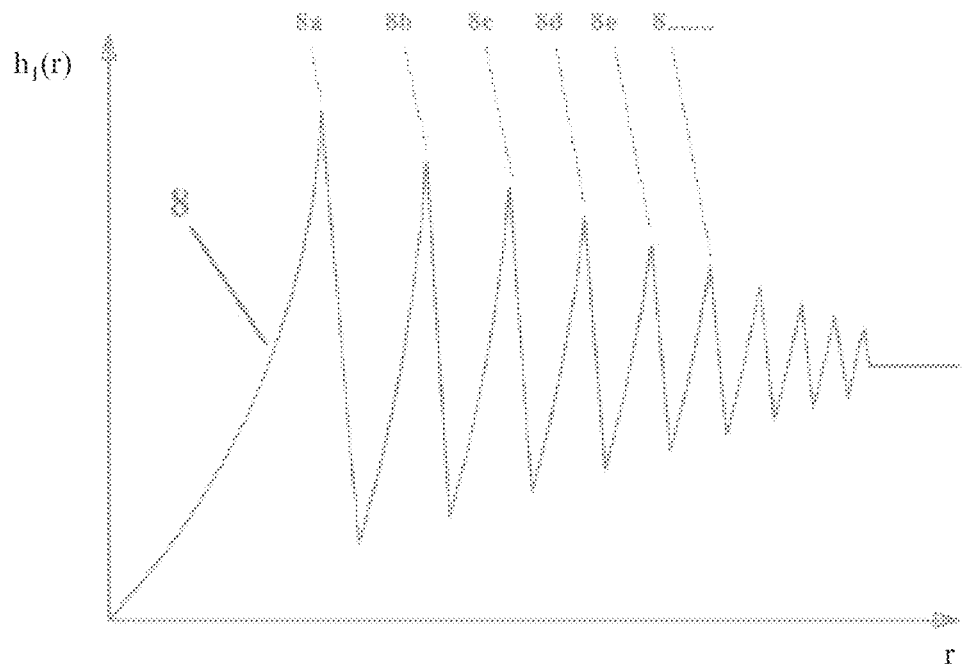
FIGS. 5A and 5B are graphs showing two diffraction profiles that can be combined according to some embodiments of the present invention to form the diffraction profile of FIG. 3.
Figure 5B:
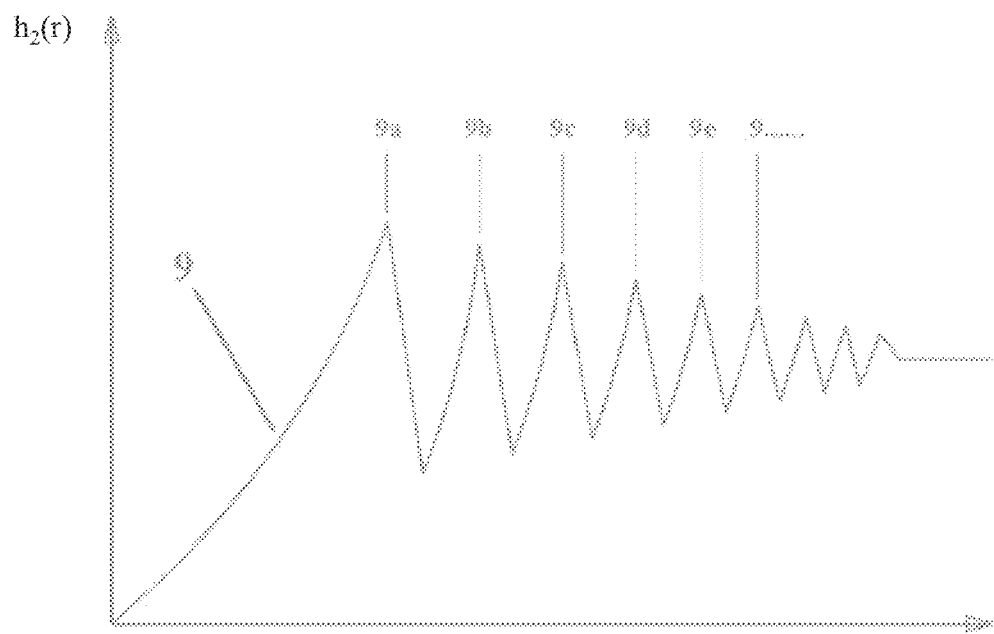

The relief pattern 2, as manifested by diffraction profile 7, can optionally and preferably be described as a combination of two diffraction profiles. This is illustrated in FIGS. 5A and 5B, showing a first diffraction profile 8 (FIG. 5A) and a second diffraction profile 9 (FIG. 5B), both in the form of height functions $h_1(r)$ and $h_2(r)$, respectively. Each of height functions $h_1(r)$ and $h_2(r)$ is generally periodic. The periods of profile 8 are designated 8a, 8b, 8c and so on, and periods of profile 9 are designated 9a, 9b, 9c and so on. Profile 8 is optionally and preferably selected so as to allow relief pattern 2 to form a set of first-order diffraction foci, and profile 9 is optionally and preferably selected so as to allow relief pattern 2 to form a set of second-order diffraction foci.

Figure 6A:
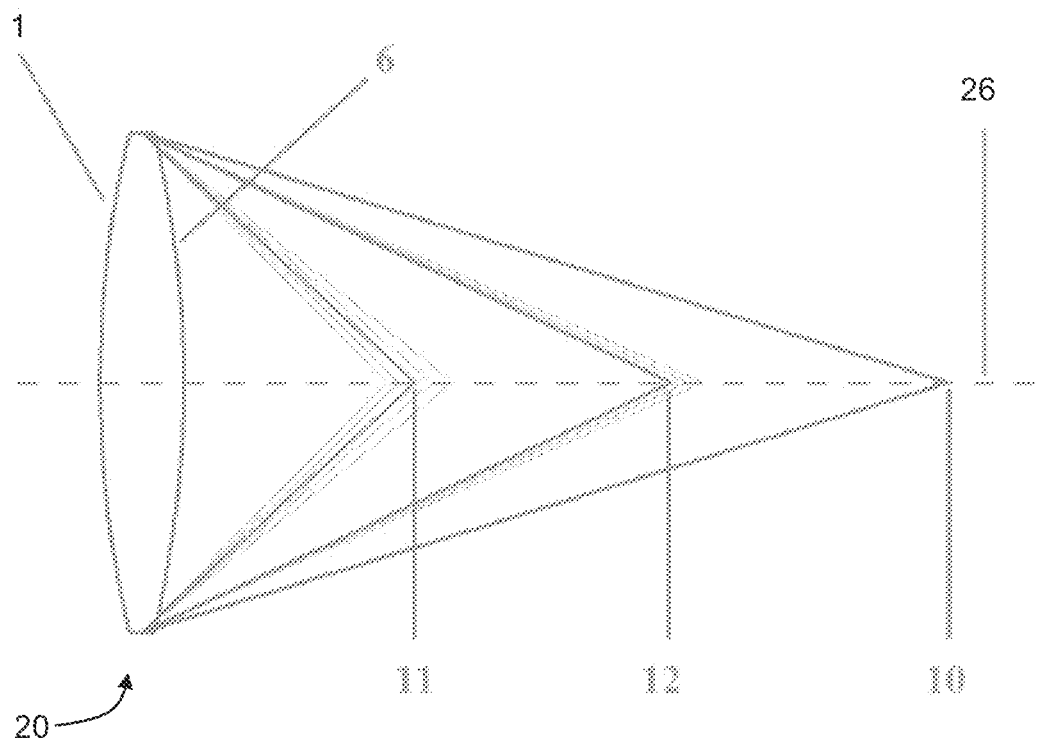
FIGS. 6A-C are schematic illustrations showing a plurality of foci, according to some embodiments of the present invention.
Figure 6B:
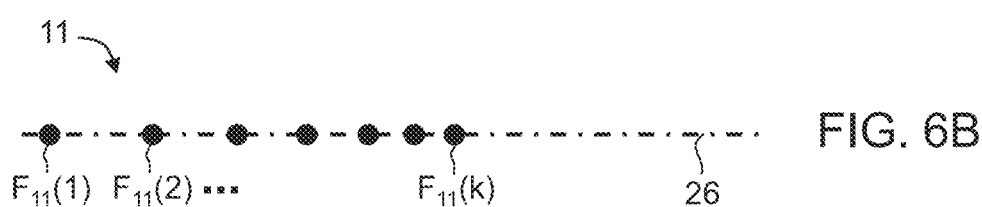
Figure 6C:
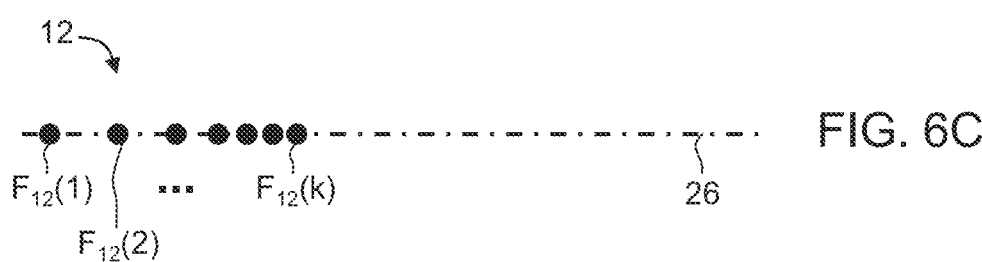

In various exemplary embodiments of the invention the diffraction profile 7 (FIG. 3) that is effected by lens device 20 is a sum of diffraction profile 8 (FIG. 5A) and diffraction profile 9 (FIG. 5B). The diffraction profile 7 can thus provide two sets of diffraction foci. A representative example of two sets of diffraction foci 11 and 12 is illustrated schematically in FIG. 6A. The set 11 of foci which is nearer to lens device 20 among the two sets is optionally and preferably provided by profile 8, and the set 12 of foci which is farther from lens device 20 is optionally and preferably provided by profile 9. The two sets of diffraction foci 11 and 12 are at two distinct regions on optical axis 26, such that the farthest focal point of set 11 is nearer to device 20 than any of the foci of set 12. Preferably, profile 8 is selected to provide a near vision and profile 9 is selected to provide an intermediate vision to an eye of a subject hosting lens device 20. Magnified views of the sets 11 and 12 are illustrated in FIGS. 6B and 6C, in which $F_{11}(i)$, i=1, 2, . . . , k denotes the ith focal point in set 11, and which $F_{12}(i)$, i=1, 2, . . . , k denotes the ith focal point in set 12, where the index i is defined such that for each set of foci, a focal point whose index is i+1 is farther from lens device 20 than a focal point whose index is i.

In any of the embodiments described herein at least of the surfaces 1 and 6 has a curvature selected to form on optical axis 26 a refractive focal point 10 which is farther than any first-order diffractive focal point formed by diffraction profiles 8 and 9. Focal point 10 are preferably selected to the eye hosting lens device 20 with a far vision. Representative examples of refractive optical powers describing focal point 10 include, without limitation, from about −99 diopters to about 99 diopters, more preferably from about −50 diopters to about 50 diopters.

In some embodiments of the present invention the profiles 8 and 9 are selected such that the second-order diffraction foci of profile 9 approximately coincide with the first order diffraction foci 11 of profile 8. The advantage of this embodiment is that a portion of the light is used for assisting near vision.

A representative example of a mathematical function that describes the heights of the odd-numbered steps in relief pattern 2 is:

$$H_1(r) = (\lambda/2)(A_1(r)/n_1 - n_2),$$

where, r is a radial coordinate denoting the distance of the respective step from the optical axis, $\lambda$ is the wavelength at which the eye has greatest sensitivity (typically 550 nm), $n_1$ and $n_2$ are refractive indices of the material of the lens and of its implantation medium, respectively, and $A_1(r)$ is a dimensionless near vision amplitude factor that varies with r.

A representative example of a mathematical function that describes the heights of the even-numbered steps in relief pattern 2 is:

$$H_2(r) = (\lambda/2)(A_2(r)/n_1 - n_2),$$

where $\lambda$, $n_1$ and $n_2$ are the same as defined above, and $A_2(r)$ is a dimensionless intermediate vision amplitude factor that varies with r.

In some embodiments of the present invention at least one of $H_1(r)$ and $H_2(r)$ is apodized with decreasing amplitudes as a function of the radial coordinate r. This can be achieved, for example, by selecting $A_1(r)$ and/or $A_2(r)$ to be a decreasing function of r. For example, $A_1(r)$ and/or $A_2(r)$ can be embodied as a geometric series with the largest term for the innermost step (odd or even, respectively) and the lowest term for the outermost step (odd or even, respectively). Preferably, but not necessarily, each of $A_1(r)$ and $A_2(r)$ decreases by at least 1% between successive odd or even steps. A representative value for $A_1(r)$ for the innermost odd step is, without limitation, from about 0.9 to 0.99, e.g., about 0.96. A representative value for $A_2(r)$ for the innermost even step is, without limitation, from about 0.57 to 0.62, e.g., about 0.60. In some embodiments of the present invention the minimal value of $A_1(r)$ (for the outermost odd step) is from about 0.58 to 0.62, e.g., 0.60. In some embodiments of the present invention the minimal value of $A_2(r)$ (for the outermost even step) is from about 0.28 to 0.32, e.g., 0.30.

In some embodiments of the present invention the ratio between the minimal value of $A_1(r)$ (for the outermost odd step) and the maximal value of $A_1(r)$ (for the innermost odd step) is from about 0.25 to about 0.4. In some embodiments of the present invention the ratio between the minimal value of $A_2(r)$ (for the outermost even step) and the maximal value of $A_2(r)$ (for the innermost even step) is from about 0.25 to about 0.4.

The ratio between $A_2(r)$ and $A_1(r)$ is preferably constant throughout the geometric series. In these embodiments, the dimensionless near vision amplitude factor for the ith step, where i is an odd integer and i=1 corresponds to the inner most step, can be $A_1(i) = A_0 q^{i-1}$, and the dimensionless intermediate vision amplitude factor for the jth period, where j=i+1 is an even integer and j=2 corresponds to the innermost even step, can be $A_2(j) = pA_0 q^{j-2}$, where p, $A_0$ and q are constant parameters. For example, $A_0$ can be from about 0.9 to 0.99, e.g., about 0.96, q can be 0.99 or less, and p can be from about 0.55 to about 0.65, e.g., about 0.6.

The characteristic slope of each odd step is optionally and preferably less than a characteristic slope of the even step immediately following this odd step. Thus, for example, the characteristic slope of zone 1 is less than the characteristic slope of zone 2, the characteristic slope of zone 3 is less than the characteristic slope of zone 4, and so on.

Figure 4B:
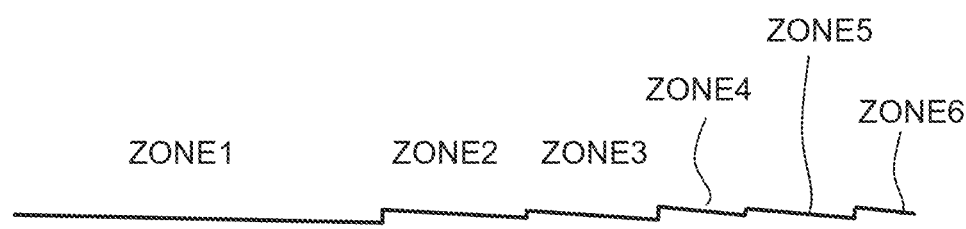

A representative illustration of odd and even zones formed according to the functions $H_1$, $H_2$, R1 and R2 above are illustrated in FIG. 4B.

In some embodiments of the present invention the odd and even steps are selected such that the diffractive optical power describing each focal point of the farther set of foci 12 is more than a half (e.g., at least 51%, and preferably at most 62%) of the diffractive optical power describing any focal point of set of foci 11. Optionally and preferably, the ratio between the diffractive optical power describing a focal point of set 12 a diffractive optical power describing a corresponding focal point of set 11 is generally constant throughout the two sets. A representative example of a diffractive optical power suitable for describing any focal point of set 11 is from about +1.5 diopters to about +5 diopters or more. A representative example of a diffractive optical power suitable for describing any focal point of set 12 is from about +0.77 diopters to about +3.0 diopters or more, but preferably, as stated, at least 51% of the diffractive optical power of any period of set 11.

In some embodiments of the present invention the diffractive optical powers describing any pair of adjacent foci of set 11 and/or set 12 are at least one percent from each other. Specifically, denoting the diffractive optical power of the ith focal point of sets 11 and 12 by $D_{11}(i)$ and $D_{12}(i)$, respectively, at least one, and more preferably both, of the following relations is employed: $D_{11}(i+1)/D_{11}(i) \le 0.99$ and $D_{12}(i+1)/D_{12}(i) \le 0.99$. The inter-focus distances between a pair of foci in set 11 is preferably larger than inter-focus distances between a corresponding pair of foci in set 12. In some embodiments of the present invention the foci in at least one set form a geometric series. For example, $D_{11}(i)$ can satisfy the relation $D_{11}(i) = d_{11} Q^{i-1}$ diopters and $D_{12}(i)$ can satisfy the relation $D_{12}(i) = d_{12} Q_{12}^{i-1}$ diopters, where $d_{11}$, $Q_{11}$, $d_{12}$ and $Q_{12}$ are constants. In some embodiments of the present invention $Q_{11} = Q_{12}$. When the foci in each set form a geometric series the embodiments in which the diffractive optical power describing each focal point of set 12 is more than a half of the diffractive optical power describing any focal point of set 11, can be ensured by selecting $Q_{11} = Q_{12}$ and $0.51 d_{11} \le d_{12} \le 0.51 d_{11}$. Representative examples of values suitable for $Q_{11}$ and/or $Q_{12}$ include, without limitation, 0.99 or 0.98 or 0.97 or less. Representative examples of values suitable for $d_{11}$ include, without limitation, from about +1.5 diopters to about +5 diopters. Representative examples of values suitable for $d_{12}$ include, without limitation, from about +0.77 diopters to about +2.5 diopters.

The present Inventor found that the selection of the zones of the diffractive surface, particularly the steps' height and the planar areas, can ensure predetermined distribution of the light intensity exiting the lens. The distribution of the light intensity can be defined as the percentages of the intensities that arrive at focal point 10 and each of sets 11, 12 when a light beam passes through the diffractive surface and through a pupil aperture of b mm in diameter. Typically, the light distribution is denoted X10:X11:X12, where X10 is the percentage of light intensity that arrives at focal point 10, X11 is the percentage of light intensity that arrives at set 11, and X12 is the percentage of light intensity that arrives at set 12. The percentages are measured out of the total light intensity that arrives onto the optical axis, so that X10+X11+X12 ≤ 100%.

In various exemplary embodiments of the invention, when b equals about 3 mm, X10 is from about 42% to about 58%, or from about 45% to about 55%, or from about 46% to about 54%, e.g., about 50% subjected to the constraint X10+X11+X12 ≤ 100%. In various exemplary embodiments of the invention, when b equals about 3 mm, X11 is from about 24% to about 36%, or from about 25% to about 35%, or from about 26% to about 34%, or from about 27% to about 33%, or from about 28% to about 32%, e.g., about 30% subjected to the constraint X10+X11+X12≤100%. In various exemplary embodiments of the invention, when b equals about 3 mm, X12 is from about 14% to about 26%, or from about 15% to about 25%, or from about 16% to about 24%, or from about 18% to about 22%, e.g., about 20%, subjected to the constraint X10+X11+X12≤100%.

According to some embodiments of the present invention there is provided a method of manufacturing an implantable lens device, such as, but not limited to, device 20. The method comprises forming on a surface of an optical material a relief pattern extending concentrically on the surface and having a sequence of annular concentric steps characterized by alternating heights, as further detailed hereinabove.

The lens device of the present embodiments can be fabricated in any technique known in the art. Generally, the present embodiments form on a substance a plurality of concentric annular zones separated by slanted steps, wherein the concentric zones effect both diffraction and refraction of incident light, while the steps are substantially devoid of any diffractive or refractive power. The substance on which the zones and steps are formed can be an unprocessed or partially processed lens body, in which case the formation of zones and steps serves for forming the lens device directly. Alternatively, the substance can be a mold, in which case the formation of zones and steps serves for forming a lens mold for mass fabrication of lens devices. In these embodiments, the lens device can be cased using the lens mold, as known in the art.

The formation of zones and steps may be done by any convenient manufacturing means, including, for example, a computer-controllable manufacturing device, molding or the like.

A "computer controllable manufacturing device" refers to a device that can be controlled by a computer system and that is capable of producing directly a lens body or a mold for producing a lens device. Any known, suitable computer controllable manufacturing device can be used in the invention. Exemplary computer controllable manufacturing devices includes, but are not limited to, lathes, grinding and milling machines, molding equipment, and lasers. In various exemplary embodiments of the invention a Computerized Numeric Controlled (CNC) lathe machine is used, such as the lathers marketed under the trade names DAC™ Vision, Optoform and CareTec.

A Fast Tool Servo (FST) is optionally employed to form the toric profile. In these embodiments, the lathe machine can generate the diffractive pattern and the aspheric profile, and the FTS can generate the toric profile.

The present embodiments also contemplate a method of treating vision of a subject in need thereof. The method comprises implanting a multifocal lens device in an eye of the subject, thereby treating the vision of the subject. The multifocal lens device is preferably device 10 as further detailed hereinabove. The method can be executed, for example, while or subsequently to a cataract surgery.

According to some embodiments of the present invention there is provided a method of treating vision of a subject. The method comprises implanting lens device 20 in an eye of the subject.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Table 1 below describes lens device 20 in an exemplary embodiment, which is not to be considered as limiting, in which, lens device 20 has a maximal addition power of 4.5 diopters and includes six zones. In this exemplary embodiment, the lens is made of a material characterized by a refractive index of 1.49, and the refractive index of the implantation medium is 1.336.

TABLE 1

| No. | Addition Power (diopters) | Focal length (mm) | Zone Radius (mm) | Area of Zone (mm²) | $A_1$ or $A_2$ | Height (mm) |
|---|---|---|---|---|---|---|
| 1 | 4.5 | 222 | 0.4944 | 0.7679 | 0.96 | 0.00171 |
| 2 | 2.34 (52% of near-vision zone 1) | 427 | 0.6856 | 0.7088 | 0.56 | 0.001 |
| 3 | 4.41 (98% of near-vision zone 1) | 227 | 0.8650 | 0.8740 | 0.94 | 0.00168 |
| 4 | 2.29 (52% of near-vision zone 3) | 436 | 0.9795 | 0.6631 | 0.548 | 0.00098 |
| 5 | 4.32 (98% of near-vision zone 3) | 231 | 1.1281 | 0.9841 | 0.921 | 0.00164 |
| 6 | 2.25 (52% of near-vision zone 5) | 445 | 1.2118 | 0.6151 | 0.537 | 0.000959 |

Table 2 below describes lens device 20 in an exemplary embodiment, which is not to be considered as limiting, in which, lens device 20 has a maximal addition power of 4.5 diopters and includes six zones. In this exemplary embodiment, the lens is made of a material characterized by a refractive index of 1.42, and the refractive index of the implantation medium is 1.336.

TABLE 2

| No. | Addition Power (diopters) | Focal length (mm) | Zone Radius (mm) | Area of Zone (mm²) | $A_1$ or $A_2$ | Height (mm) |
|---|---|---|---|---|---|---|
| 1 | 4.50 | 222 | 0.4944 | 0.7679 | 0.960 | 0.00314 |
| 2 | 2.34 (52% of near-vision zone 1) | 427 | 0.6856 | 0.7089 | 0.560 | 0.00183 |
| 3 | 4.41 (98% of near-vision zone 1) | 227 | 0.8650 | 0.8740 | 0.940 | 0.00308 |
| 4 | 2.29 (52% of near-vision zone 3) | 436 | 0.9795 | 0.6630 | 0.548 | 0.00179 |
| 5 | 4.32 (98% of near-vision zone 3) | 231 | 1.1281 | 0.9841 | 0.921 | 0.00302 |
| 6 | 2.25 (52% of near-vision zone 5) | 445 | 1.2118 | 0.6151 | 0.537 | 0.00176 |

In Tables 1 and 2, the zone's number is indicated on the left-most column, where zone No. 1 is the innermost zone and zone 6 is the outermost zone. The odd-numbered zones (zone Nos. 1, 3 and 5) provide diffraction power for near-vision, and the even-numbered zones (zone Nos. 2, 4 and 6) provide diffraction power for intermediate vision. The area of the first zone is calculated as the area of a planar disk which is the projection of the first zone on a plane perpendicular to the optical axis. The area of the each of the other zones is calculated as the area of a planar ring which is the projection of the respective zone on the plane perpendicular to the optical axis. The focal length is calculated as 1000/d, where d is the addition power in diopters. The heights of the odd-number zones are calculated according to the equation $H_1(r)=(\lambda/2)(A_1(r)/n_1-n_2)$, and heights of the even-number zones are calculated according to the equation $H_2(r)=(\lambda/2)(A_2(r)/n_1-n_2)$, where $\lambda=550$ nm, and the values of $A_1(r)$ and $A_2(r)$ are given in the penultimate columns of Tables 1 and 2.

Unlike conventional lenses, in the lens described in Tables 1 and 2, no two zones have the same planar area. Additionally, no two near-vision zones (the odd-number zones) have the same addition power. This is unlike conventional lenses in which all near-vision zones have the same addition power.

Figure 7:
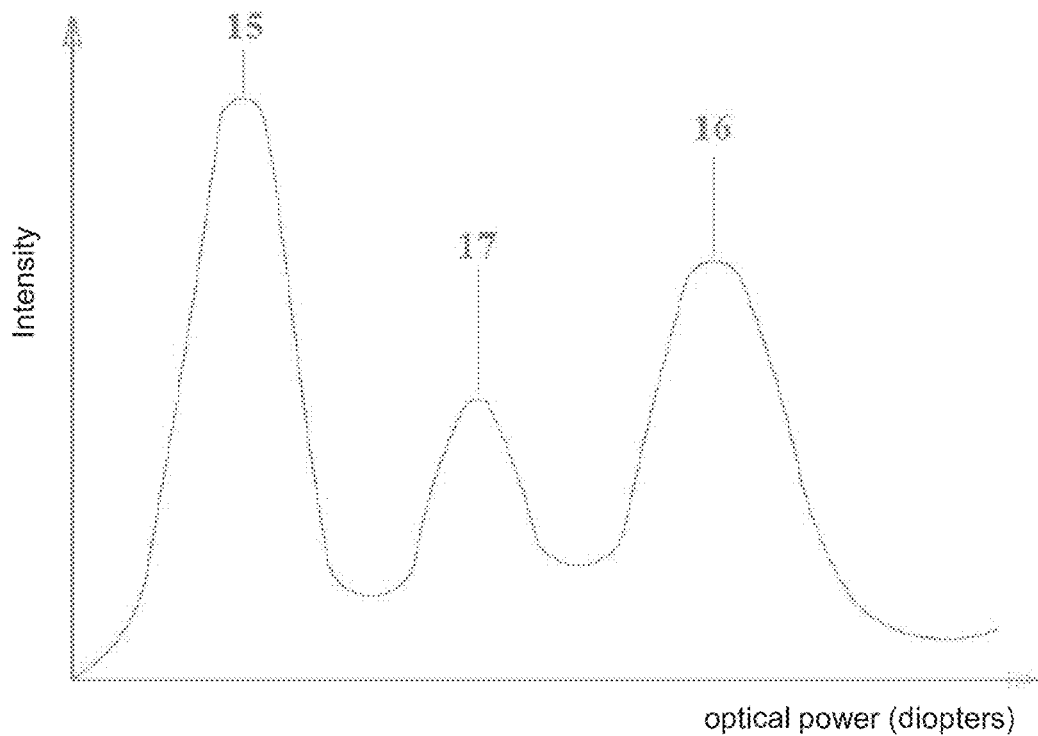
FIG. 7 is a graph showing a light distribution obtained for a pupil aperture diameter of about 3 mm, according to some embodiments of the present invention.

The optical performances of the implantable lens device 20 of the present embodiments can be characterized by determining the light distribution along the optical axis. FIG. 7 is a graph showing light intensity (in arbitrary units) of device 20 along the optical axis 26 as a function of the optical power, as obtained by computer simulations for a pupil aperture diameter of about 3 mm, using an eye model according to the ISO standard at a spatial frequency of 50 cycles/mm. The graph corresponds to the embodiment illustrated in FIGS. 5A and 5B, in which the amplitude of the two diffractive profiles 8, 9 decreases as a function of r.

As shown, the light distribution exhibits three peaks 15, 16 and 17. These peaks respectfully correspond to the refractive focal point 10 for far vision, the set 11 of foci for near vision, and the set 12 of foci for the intermediate vision. The light intensity distribution among the three focal points or sets of foci, as calculated from the MTF, is from about 45% to about 55% for the far vision, e.g., about 50% (peak 15), about from about 25% to about 35% for the near vision, e.g., about 30% (peak 16), and from about 15% to about 25% for the intermediate vision, e.g., about 20% (peak 17).

Figure 8:
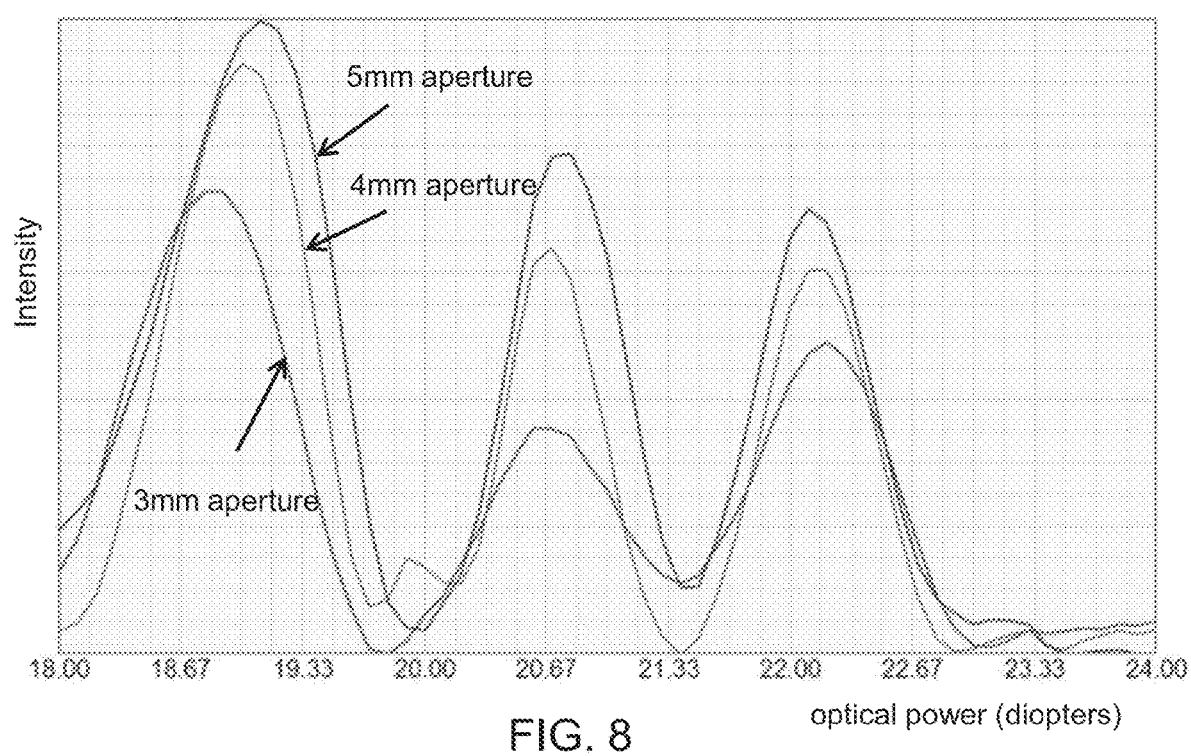
FIG. 8 is a graph showing light distribution obtained for several pupil aperture diameters, according to some embodiments of the present invention.

FIG. 8 is a graph showing light intensity (in arbitrary units) of device 20 along the optical axis 26 as a function of the optical power, as obtained experimentally for three different pupil aperture diameters (3 mm, 4 mm and 5 mm) using an eye model according to the ISO standard at a spatial frequency of 50 cycles/mm. The graph corresponds to the embodiment illustrated in FIGS. 5A and 5B, in which the amplitude of the two diffractive profiles 8, 9 decreases as a function of r. As shown, when the pupil aperture diameter increase, more light arrives for each of the focal point or sets of foci.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An implantable lens device, comprising a diffractive surface defining an optical axis, said diffractive surface comprising a relief pattern extending concentrically on said surface and having a sequence of annular concentric steps characterized by alternating heights, wherein a height of any even-numbered step is less that the heights of odd-number steps adjacent thereto, and wherein an innermost step of said relief pattern has a largest height among all other steps;

wherein each annular concentric step has a primary surface providing a zero-order refractive power for far-vision, a secondary surface providing diffraction power for near-vision and intermediate-vision, and a rounded apex connecting said primary and said secondary surfaces, wherein said secondary surface is steeper than said primary surface, and wherein said sequence of annular concentric steps is characterized by varying widths of said secondary surfaces, such that no two steps have secondary surfaces with the same widths.

2. A method of treating vision of a subject, the method comprising implanting the lens device of claim 1 in an eye of the subject.

3. The device according to claim 1, wherein said sequence of annular concentric steps is characterized by varying primary widths, such that no two steps have the same primary width.

4. The device according to claim 1, wherein said sequence of annular concentric steps is characterized by varying slopes, such that no two steps have the same slope.

5. The device according to claim 1, wherein said relief pattern corresponds to a combination of a first periodic diffraction profile selected to enable formation of a first set of diffraction foci on said optical axis and a second periodic diffraction profile to enable formation of a second set of diffraction foci on said optical axis, wherein each diffraction profile has multiple periods, and wherein said innermost step corresponds to a sum of innermost periods of said two diffraction profiles.

6. The device according to claim 5, wherein at least one of said diffraction profiles is apodized with decreasing amplitudes as a function of a radial coordinate characterizing said diffraction profile.

7. The device according to claim 5, wherein said first set of foci is nearer to said diffractive surface than said second set of foci, and wherein a characteristic slope of each period of said first diffraction profile is less than a characteristic slope of a corresponding period of said second diffraction profile.

8. The device according to claim 1, wherein said sequence of annular concentric steps comprises an odd-numbered sub-sequence of annular concentric steps providing a first set of foci, and an even-numbered sub-sequence of annular concentric steps providing a second set of foci, said first set of foci being nearer to said diffractive surface than said second set of foci, and wherein a diffractive optical power describing each focal point of said second set is at least 51 percents of a diffractive optical power describing any focal point of said first set.

9. The device according to claim 8, wherein a characteristic slope of each odd-numbered step in said odd-numbered sub-sequence is less than characteristic slope of an even-numbered step immediately following said odd-numbered step.

10. The device according to claim 8, wherein a ratio between a diffractive optical power describing a focal point of said farther set of foci and a diffractive optical power describing a corresponding focal point of said nearer set foci is generally constant throughout said sets of foci.

11. The device according to claim 8, wherein a diffractive optical power describing each focal point of said nearer set of foci is at least +1.5 diopters.

12. The device according to claim 8, wherein a diffractive optical power describing each focal point of said nearer set of foci is at most +5 diopters.

13. The device according to claim 8, wherein a diffractive optical power describing each focal point of said farther set of foci is at least +0.77 diopters.

14. The device according to claim 8, wherein a diffractive optical power describing each focal point of said farther set of foci is at most +3.0 diopters.

15. The device according to claim 8, wherein for at least one set of said two sets of foci, diffractive optical powers describing any pair of adjacent foci of said set are at least one percent from each other.

16. The device according to claim 5, wherein said surface has a curvature selected to form on said optical axis a refractive focal point which is farther than any diffractive focus formed by said diffraction profiles.

17. The device according to claim 16, wherein said curvature and said steps are selected such that when a light beam passes through said surface and through a pupil aperture of about 3 mm, the percentage of light intensity which is focused onto said refractive focal point is from about 42% to about 58%.

18. The device according to claim 16, wherein said curvature and said steps are selected such that when a light beam passes through said surface and through a pupil aperture of about 3 mm, the percentage of light intensity which is focused onto said a farther set of said two sets of foci is from about 14% to about 26%.

19. The device according to claim 16, wherein said curvature and said steps are selected such that when a light beam passes through said surface and through a pupil aperture of about 3 mm, the percentage of light intensity which focused onto said a nearer set of said two sets of foci is from about 24% to about 36%.

20. A method of manufacturing an implantable lens device, the method comprising forming on a surface of an optical material a relief pattern extending concentrically on said surface and having a sequence of annular concentric steps characterized by alternating heights, wherein a height of any even-numbered step is less that the heights of odd-number steps adjacent thereto, and wherein an innermost step of said relief pattern has a largest height among all other steps;

wherein each annular concentric step has a primary surface providing a zero-order refractive power for far-vision, a secondary surface providing diffraction power for near-vision and intermediate-vision, and a rounded apex connecting said primary and said secondary surfaces, wherein said secondary surface is steeper than said primary surface, and wherein said sequence of annular concentric steps is characterized by varying widths of said secondary surfaces, such that no two steps have secondary surfaces with the same widths.

* * * * *